United States Patent [19]

Garberg et al.

[11] Patent Number: 5,724,481
[45] Date of Patent: Mar. 3, 1998

[54] METHOD FOR AUTOMATIC SPEECH RECOGNITION OF ARBITRARY SPOKEN WORDS

[75] Inventors: Roger Borgan Garberg, Naperville; Michael Allen Yudkowsky, Chicago, both of Ill.

[73] Assignee: Lucent Technologies Inc., Murray Hill, N.J.

[21] Appl. No.: 413,330

[22] Filed: Mar. 30, 1995

[51] Int. Cl.$^6$ .............. G10L 5/06; G41H 9/00; H04M 1/64
[52] U.S. Cl. .............. 395/2.52; 395/2.6; 379/88; 379/89
[58] Field of Search ............. 395/2.52, 2.55, 395/2.6, 2.67, 2.54, 2.79, 2.84; 379/59, 88, 67, 89

[56] References Cited

U.S. PATENT DOCUMENTS

| | | | |
|---|---|---|---|
| 5,125,022 | 6/1992 | Hunt et al. | 379/88 |
| 5,127,043 | 6/1992 | Hunt et al. | 379/88 |
| 5,165,095 | 11/1992 | Borcherding | 379/88 |
| 5,212,730 | 5/1993 | Wheatley et al. | 395/2.6 |
| 5,297,183 | 3/1994 | Bareis et al. | 379/59 |
| 5,303,299 | 4/1994 | Hunt et al. | 379/88 |
| 5,329,608 | 7/1994 | Bocchieri et al. | 395/2.52 |
| 5,479,489 | 12/1995 | O'Brien | 389/67 |

Primary Examiner—Allen R. MacDonald
Assistant Examiner—Patrick N. Edouard
Attorney, Agent, or Firm—Mony R. Ghose

[57] ABSTRACT

A method and system for allowing an automatic speech recognition (ASR) system to recognize arbitrary words, by accessing information in a supplemental data base. A supplemental data base is accessed to retrieve supplementary textual information, such as a proper name. A text-to-speech means is used to generate a phoneme transcription of the text retrieved from the supplemental data base, so that the transcription may be used as a speaker independent template by the ASR system for recognizing a spoken word.

15 Claims, 3 Drawing Sheets

METHOD FOR AUTOMATIC SPEECH RECOGNITION OF ARBITRARY SPOKEN WORDS

FIELD OF THE INVENTION

The present invention relates to automatic speech recognition. More particularly, the invention relates to a method of using supplemental information retrieved from a data base in conjunction with a telephone network to assist an automatic speech recognition (ASR) system in recognizing a word spoken by the user.

BACKGROUND OF THE INVENTION

For many applications, it is advantageous to use computers to automate repetitive tasks so that the tasks may be performed more quickly and efficiently. Speech recognition, a type of voice technology, allows people to interact with computers using spoken words. Speech recognition is challenging, however, because of the inherent variations of speech among different people.

One application of speech recognition a telephone network. Using automatic speech recognition (ASR) systems, people can communicate over the telephone so that simple tasks can be performed without operator intervention. For example, speech recognition may be used for dialing so that the telephone user need not remember, look up, or ask for a telephone number. The ability to use speech instead of physical manipulation of a user interface has kept the demand for ASR technology high as advances in telecommunications continue. Generally, there are two types of ASR systems used in telecommunications: speaker dependent and speaker independent.

One common implementation of a speaker dependent automatic speech recognition system uses a computer which is "trained" by a particular speaker to respond to the speaker's speech patterns. The training process comprises the vocalization of a sound (i.e., a word) to generate an analog speech input, conversion of the speech input into signal data, generation of a template representing the sound and storage of the indexed template to appropriate specific response data, such as a computer instruction to instigate an action.

During real time operations, the words spoken by the training speaker are digitized and compared to the set of speaker dependent templates in the ASR system so that a match between the spoken words and a template can trigger a particular response by the computer. Speaker dependent ASR systems are used primarily where the training process can be justified, e.g., where the same individuals access the system on many occasions.

For applications in which no individual training can be justified, a speaker independent ASR must be used. A common implementation of a speaker independent ASR system uses a computer to store a composite template or cluster of templates that represent a word spoken by a number of different people. The templates are derived from numerous data samples (i.e., words spoken by a plurality of speakers) which represent a wide range of pronunciations and variations in speech characteristics. Speaker independent speech recognition systems can interact with a wide variety of people without speaker-specific training.

Telephone applications which use speaker independent ASR to recognize spoken numbers are known in the art. These applications are especially useful when the vocabulary of the speaker is limited to a few menu commands and/or numbers (e.g. 0–9). It is very difficult, however, to recognize spoken letters (A–Z) over the telephone network. Indeed, due to various types of noise and bandwidth limitations, coupled with the wide variety of speech patterns among individual speakers, the telephone environment makes all ASR applications (speaker dependent and speaker independent) prone to error.

Nonetheless, a sought-after commercial application of ASR is automating tasks associated with commercial transactions, e.g., credit card transactions, made via the telephone network. For example, if a customer wishes to purchase goods or services over the telephone, ASR could be used to gather pertinent information and to authorize the transaction quickly and efficiently with minimal operator intervention.

Telephone purchases of goods or services made by using a credit/debit card may require the customer to provide his or her name (or other predetermined information) as a step in the transaction. Unfortunately, it the recognition of arbitrary spoken word information (such as the customer's name) that has inhibited the use of ASR technology by those entities which need it most, such as high volume businesses.

This is because high volume businesses not only require an ASR system to recognize arbitrary spoken words (e.g. proper names), but also require ubiquitous access to the ASR system. For example, to serve the needs of a high volume business with potential customers across an entire country using conventional ASR systems, speaker independent templates corresponding to the name of every person in the entire country would have to be created and stored using techniques described above. The present state of the art ASR systems, however, are incapable of matching a spoken name with one of the millions of possible names corresponding to the stored templates.

Therefore, there is a need in the art for improvements in ASR systems which will enable such systems to automatically recognize spoken words with increased capability.

SUMMARY OF THE INVENTION

This need is addressed and a technical advance is achieved in the art by a method and system for utilizing supplemental data to enhance the capability of an ASR system so that the system can quickly and accurately recognize arbitrary spoken words, such as proper names.

It is common practice in telephony applications of an ASR system to solicit a telephone number from a caller. The telephone number of the caller may be obtained by speech or other known methods, such as caller ID or touch tone entry. Therefore, in accordance with one exemplary embodiment of the method and system of the present invention, the telephone number of the caller serves as an index for retrieving text (i.e., the caller's name) from a data base. This text is then used to limit or specify the choices available to an ASR system.

More particularly, the telephone number of the caller is used to access a supplemental data base to retrieve text associated with the telephone number. In the above-mentioned exemplary embodiment, text containing the caller's name is retrieved from the supplemental data base. The text of the caller's name comprises a digitized alphanumeric representation of the caller's proper name. A text-to-speech system is used to transcribe the text of the caller's name to a phoneme transcription, as is known in the art. The phoneme transcription of the name is stored in the ASR system as a speaker independent template so that speech which conforms to the transcription can be recognized by the ASR system. Retrieval and conversion of supplemental textual data to a phoneme transcription allows the ASR system to respond immediately to spoken words which correspond to the transcription of the data retrieved in the absence of speaker-specific training.

During real time applications of the above exemplary embodiment, a telephone call is received by a service provider who maintains an ASR system in accordance with the present invention. The caller, who wishes to make a credit card purchase of a good or service, is prompted for a telephone number and name. Based upon the telephone number provided by the caller, a supplemental data base (e.g. an electronic telephone directory) is accessed to retrieve the text of a name associated with the telephone number. A phoneme transcription of the text of the name retrieved from the data base is created by a text-to-speech system. The phoneme transcription is then stored as a speaker independent template to be used by the ASR system to recognize the name, as spoken by the caller.

If the name spoken by the caller is not recognized by the ASR system due to unusual pronunciation of names, poor telephone transmission quality, callers whose voices are difficult to recognize, etc., the caller is prompted to provide a spelling of their name, letter by letter. The text-to-speech system may be used to create a phoneme transcription of the spelling of the written name, as retrieved from the data base. The spelling of the name retrieved from the data base is also stored as a speaker independent template in the ASR system so that the system can attempt to recognize the spelling of the caller's name (as spoken by the caller). If there is no match of the spoken utterance of the caller's name and the phoneme transcription (based upon established speech recognition algorithms), the call is routed to a human attendant.

DETAILED DESCRIPTION

Figure 1:
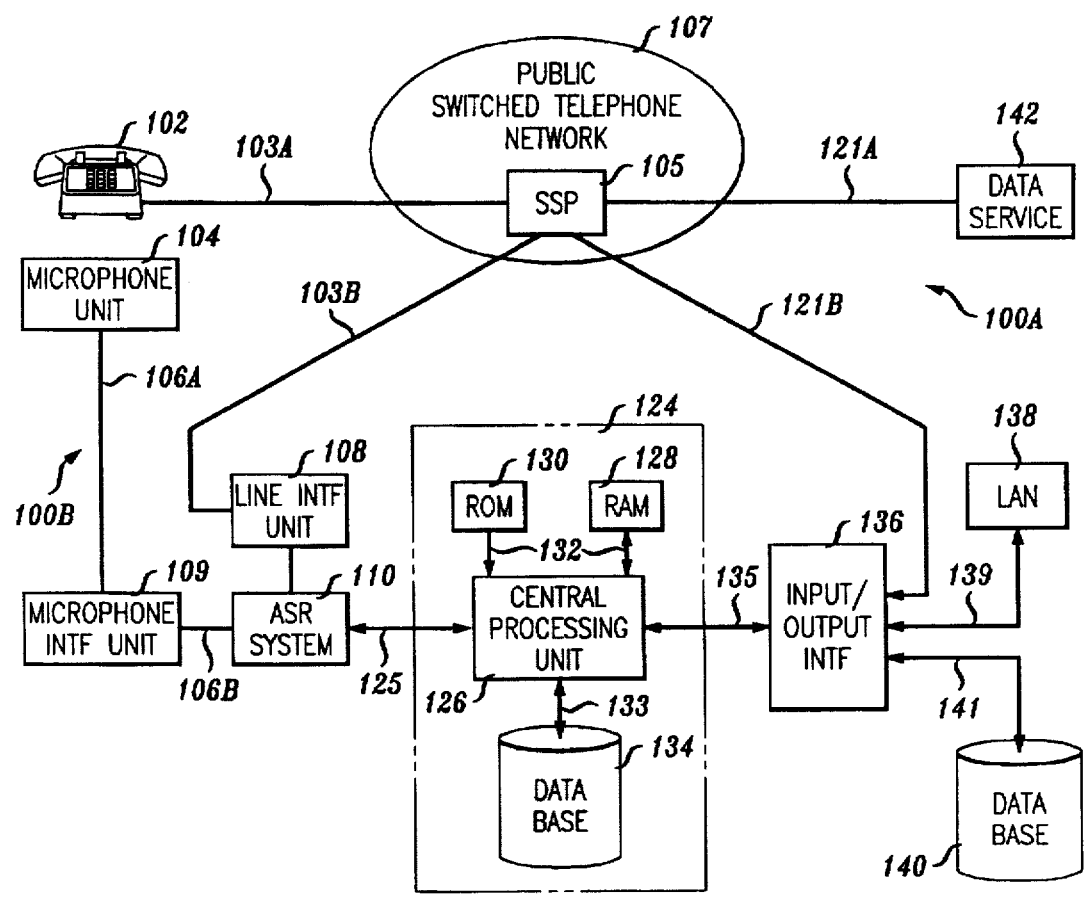
FIG. 1 is a simplified block diagram of telephone and user interactive systems associated with an ASR system in accordance with an exemplary embodiment of the present invention.

FIG. 1 shows two systems 100A and 100B in accordance with an exemplary embodiment of the present invention. Voice telephone system 100A includes calling station 102, telecommunications lines 103A and 103B and switching service point (SSP) 105 which is located in public switched telephone network 107. For clarity, a single switching service point is shown, but an operational public switched telephone network comprises an interconnected network of SSPs. Telephone line interface unit 108 protects the ASR system 110 equipment from network malfunctions, such as power surges and digitizes incoming speech from calling station 102, if the originating speech is not already digitized, before delivery to the system.

SSP 105 is a distributed control, local digital switch, such as a 5ESS® switch as described in the *AT&T Technical Journal*, Vol. 64, No. 6, July–August 1985, pages 1303–1564, the November 1981, *Bell Laboratories Record*, page 258, and the December, 1981, *Bell Laboratories Record*, page 290 and manufactured by AT&T. Alternatively, SSP 105 may be a distributed control, analog or digital switch, such as an ISDN switching system as disclosed in U.S. Pat. No. 4,592,048, issued to M. W. Beckner et al., on May 27, 1986. In FIG. 1, SSP 105 is connected via customer identified lines 103 to calling station 102 and is also in communication with host computer 124 via line 121B as described below.

Also shown in FIG. 1 is user interactive system 100B including microphone 104 and microphone interface unit 109. Microphone 104 may be disposed in a kiosk or automated teller machine (not shown) maintained by a service provider as a link between the ASR system and the consumer, as is known in the art.

Incoming speech is transformed into electrical signals by microphone 104 and delivered to microphone interface unit 109 via communications link 106A. Microphone interface unit 109 converts incoming speech signals into digital data before delivery to ASR system 110 via communications link 106B.

ASR system 110 (described in detail in FIG. 2 below) is in communication with host computer 124 via data bus 125. Host computer 124 includes central processing unit (CPU) 126 for controlling the overall operation of the computer, random access memory (RAM) 128 for temporary data storage, read only memory (ROM) 130 for permanent data storage and non-volatile data base 134 for storing control programs associated with host computer 124. CPU 126 communicates with RAM 128 and ROM 130 via data buses 132. Similarly, CPU 126 communicates with non-volatile data base 134 via data bus 133. Input/output (I/O) interface 136 is connected to host computer 124 via data bus 135 to facilitate the flow of data from local area network (LAN) 138 which is in communication with I/O interface 136 via data link 139, supplementary data base 140 which is in communication with I/O interface 136 via data link 141 and data service network 142 which transmits digital data to host computer 124 via telecommunications line 121 A, SSP 105 and data link 121B, as described below.

Figure 2:
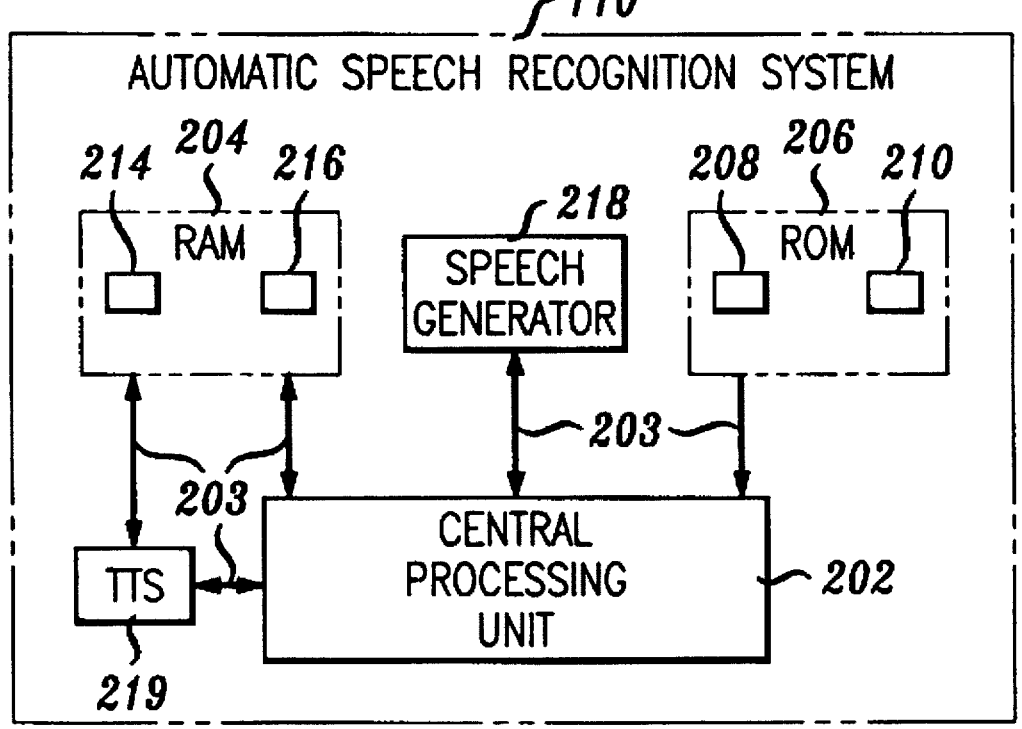
FIG. 2 is a simplified block diagram of the ASR system of FIG. 1 which is used for providing speech recognition and verification in accordance with an exemplary embodiment of the present invention.

FIG. 2 shows a simplified block diagram of an exemplary embodiment of ASR system 110 as shown in FIG. 1. ASR system 110, which is capable of either speaker independent or speaker dependent speech recognition includes CPU 202 for controlling the overall operation of the system. CPU 202 has a plurality of data buses represented generally by reference numeral 203. Also shown is random access memory (RAM) 204, read only memory (ROM) 206, speech generator unit 218 for issuing greetings and prompts to a caller and text-to-speech (TTS) system 219 (which communicates with CPU 202 and RAM 204) for transcribing written text into a phoneme transcription, as is known in the art.

RAM 204 is connected to CPU 202 by bus 203 and provides temporary storage of speech data, such as words spoken by a caller at calling station 102 or microphone station 104, speaker dependent templates 214 and speaker independent templates 216. ROM 206, also connected to CPU 202 by data bus 203, provides permanent storage of speech recognition and verification data including speech recognition algorithm 208 and models of phonemes 210. In this exemplary embodiment, a phoneme based speech recognition algorithm 208 is utilized, although many other useful approaches to speech recognition are known in the art.

A phoneme is a term of art which refers to one of a set of smallest units of speech that can be combined with other such units to form larger speech segments, e.g., morphemes.

For example, the phonetic segments of the spoken word "operator" may be represented by a combination of phonemes such as "aa", "p", "axr", "ey", "dx" and "axr". Models of phonemes 210 are compiled using speech recognition class data which is derived from the utterances of a sample of speakers in a prior off-line process. During the process words selected so as to represent all phonemes of the language are spoken by a large number of training speakers (e.g., 1000). The utterances are processed by a trained individual who generates a written text of the content of the utterances.

The written text of the word is then received by a text-to-speech unit, such as TTS system 219, so that it may create a phoneme transcription of the written text using rules of text-to-speech conversion, as is known in the art. The phoneme transcription of the written text is then compared with the phonemes derived from the operation of the speech recognition algorithm 208, which compares the utterances with the models of phonemes 210. The models of phonemes 210 are adjusted during this "model training" process until an adequate match is obtained between the phoneme derived from the text-to-speech transcription of the utterances and the phonemes recognized by the speech recognition algorithm 208, using adjustment techniques as is known in the art.

Models of phonemes 210 are used in conjunction with speech recognition algorithm 208 during the recognition process. More particularly, speech recognition algorithm 208 matches a spoken word with established phoneme models. If the speech recognition algorithm determines that there is a match (i.e. if the spoken utterance statistically matches the phoneme models in accordance with predefined parameters), a list of phonemes is generated.

Since the models of phonemes 210 represent a distribution of characteristics of a spoken word across a large population of speakers, the models can be used for a ubiquitous access to an ASR system which serves the same speaker population represented by the training speakers (i.e. native-born Americans, Spanish-speaking populations, etc.).

Speaker independent template 216 is a list of phonemes which represent an expected utterance or phrase. A speaker independent template 216 is created by processing written text through TTS system 219 to generate a list of phonemes which exemplify the expected pronunciations of the written word or phrase. In general, multiple templates are stored in RAM memory 204 to be available to speech recognition algorithm 208. The task of algorithm 208 is to choose which template most closely matches the phonemes in a spoken utterance.

Speaker dependent templates 214 are generated by having a speaker provide an utterance of a word or phrase, and processing the utterance using speech recognition algorithm 208 and models of phonemes 210 to produce a list of phonemes which comprises the phonemes recognized by the algorithm. This list of phonemes is speaker dependent template 214 for that particular utterance.

During real time speech recognition operations, an utterance is processed by speech recognition algorithm 208 using models of phonemes 210 such that a list of phonemes is generated. This list of phonemes is matched against the list provided by speaker independent templates 216 and speaker dependent templates 214, using techniques as known in the art. Speech recognition algorithm 208 reports results of the match.

Figure 3:
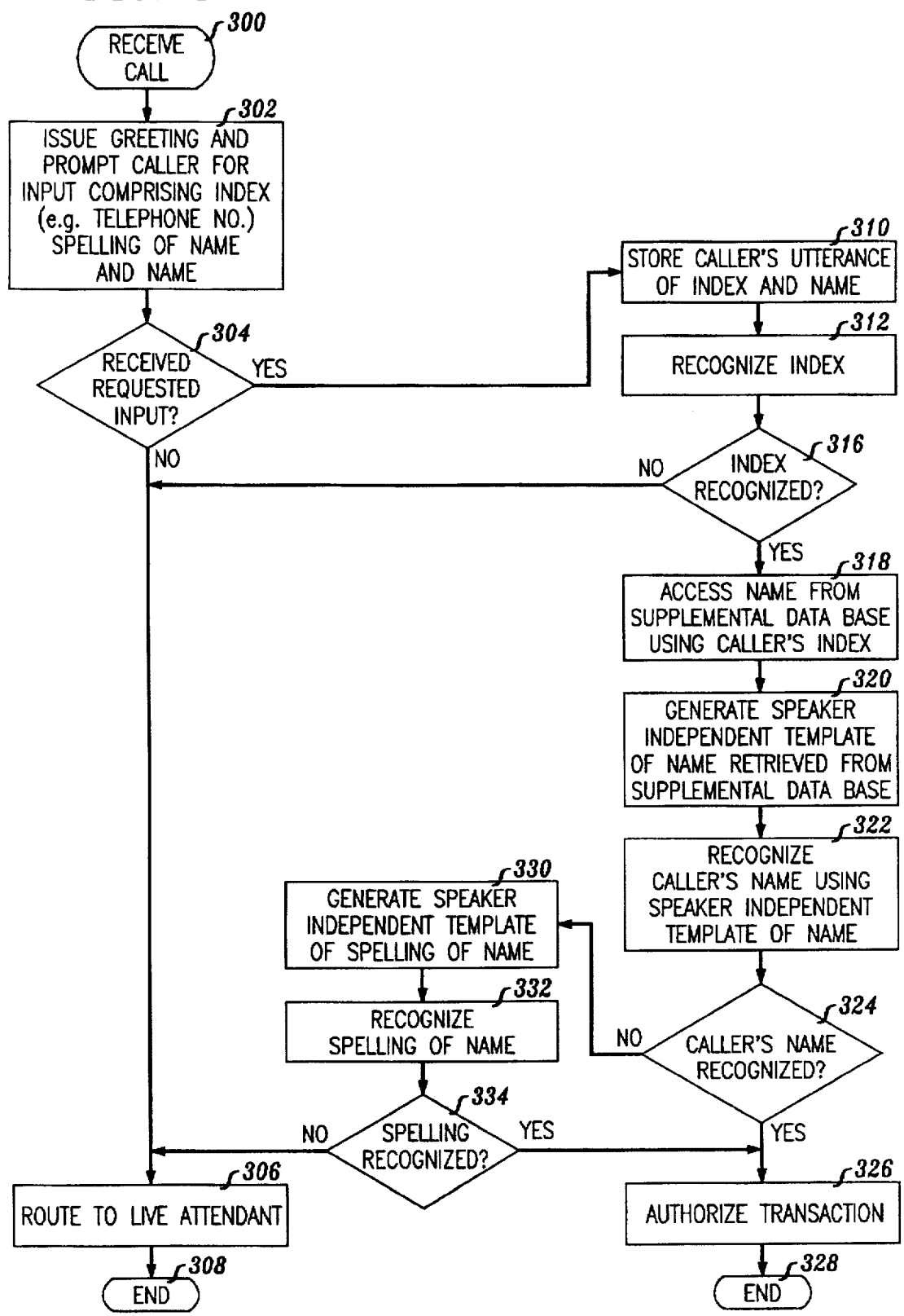
FIG. 3 is a flow diagram of an exemplary method in accordance with the present invention.

FIG. 3 is a flow diagram describing the actions taken at ASR system 110 when the system is operating in a speaker independent mode an exemplary embodiment of the method of the present invention.

As an example of a commercial application of the present invention, assume that a customer is calling from a home telephone (calling station 102) and wishes to make a credit card purchase of a service offered by a service provider who uses ASR system 110 and host computer 124. In this example, the customer has not previously purchased the service so ASR system 110 is not trained to recognize the particular speech patterns of the customer (i.e., there are no speaker dependent templates 214 established for this customer). In order for the credit card transaction to be authorized, however, ASR system 110 must receive and recognize the customer's name.

The example begins when in step 300 ASR system 110 receives a customer originated incoming call routed via telecommunications line 103A, 103B and SSP 105 of public switched telephone network 107.

Alternatively, the customer could place a service order from a kiosk which houses a user interactive system including microphone station 104. If so, an incoming "call" is received by ASR system 110 when a customer input (e.g., speech) is detected at microphone station 104 and delivered to the system via communications link 106B.

In both the telephone system and the user interactive system, the incoming call is processed by an interface unit (i.e., telephone line interface unit 108 and microphone interface unit 109, respectively) to ensure that all input received in ASR system 110 is in a common digital format.

As shown in step 302, speech generator unit 218 of AS R system 110 issues a greeting and prompts the customer for an input such as a predetermined index (e.g., a home telephone number), a name associated with the index and possibly, a spelling of the name. Alternatively, the system could defer prompting the caller for a spelling of name until it is needed in the process, as described below.

The process continues to determination step 304 where it is determined whether the requested input was received. If the result of step 304 is a "NO" decision, the process continues to step 306 where the call is routed to a live attendant and the process terminates at end step 308.

If the result in step 304 is a "YES" decision, the process continues to step 318 where the customer's utterance of the index, name and spelling of the name are stored in RAM 204 of ASR system 110. In the above example, the customer provided the index by speaking. When the index is the customer's home telephone number, it may be retrieved by other known techniques, such as caller ID or touch tone entry.

The process continues to step 310 where there is an attempt to recognize the caller's index using speech recognition algorithm 208 and model phonemes (for digits) 210. The index is used to retrieve information from a supplemental data base, as described below. If there is uncertainty about certain digits of the index, the system may be programmed to recognize multiple possibilities. In determination step 314, it is determined whether the customer's index was recognized in the preceding step. If the result of determination step is a "NO" decision, the process continues to step 306 where the call is routed to a live attendant and the process terminates at end step 308.

If the result in determination step 314 is a "YES" decision, the process continues to step 316 where CPU 202 of ASR system 110 makes a request to host computer 124 for supplemental data. In the above example, the supplemental data desired is a digitally stored representation of the customer's name (e.g., the name associated with the home telephone number received by the customer) such as in ASCII text format.

When the request for supplemental data is received at CPU 126 of host computer 124, CPU 126 determines which supplemental data base must be accessed, by using the index (e.g., the telephone number provided by the customer), to retrieve a digital representation (e.g., ASCII text format) of the customer's name. CPU 126 makes the determination based on instructions received from non-volatile data base 134.

For example, if the service provider is a large entity, it may maintain an auxiliary data base 140, such as CD-ROM data base, which communicates with host computer 124 via data link 141 and I/O interface 136. Data base 140 could contain comprehensive customer information such as customer addresses and names, credit card account numbers and purchase history indexed by telephone number. If the service provider is a small entity with a rapidly changing customer base, however, a limited supplemental data base may be stored within host computer 124 (e.g., in RAM 128).

Alternatively, some service providers may maintain a computer network (e.g. LAN 138), from which supplemental data may be downloaded to host computer 124 via data link 139 and I/O interface 136.

In the above example, assume that the service provider subscribes to a data service offered by the telecommunications network which maintains public switching telephone network 107. The data service 142 includes a data base in which it stores an electronic telephone directory including the telephone number and corresponding customer names of all residential telephones in the United States. In the above example, data service 142 sends digital data packets of information (e.g., a text of a customer's name) via telecommunication line 121A to SSP 105. SSP 105 delivers the digital information to host computer 124 via telecommunications line 121B to I/O interface 136 so that a text of the customer name can be retrieved by host computer 124 and stored in RAM 128. If multiple names are retrieved (due to multiple possibilities of home telephone numbers or multiple names associated with the telephone number), all possible names are provided to the host computer.

The process continues in step 318 where, in response to a request received from CPU 202, the text(s) of the name retrieved from the supplemental data base are retrieved from RAM 128 and processed by TTS system 219 so that a phoneme transcription of the text is generated and stored as a speaker independent template in RAM 204. As shown in step 320, recognition of the caller's name as spoken by the caller (and stored in RAM 204) is attempted using speech algorithm 208, models of phonemes 210 and the speaker independent template(s) created in step 318.

In determination step 322, a determination is made as to whether recognition occurred in the step 320. If the result of step 322 is a "YES" decision, the process continues to step 324 where the transaction is authorized and the process terminates in step 326. If the result of step 322 is a "NO" decision, the process continues to step 328 where a phoneme transcription of the spelling of customer's retrieved name (as retrieved from the data base) is created by TTS system 219 and stored as second speaker independent template. In step 330, recognition of the spelling of the customer's name, as spoken by the customer is attempted using speech recognition algorithm 208, models of phonemes 210 and the second speaker independent template created in step 328. The process continues to determination step 332 where it is determined if the spelling of the caller's name was recognized. If a "NO" decision is made in step 332, the process goes to step 306 where the call is routed to a live attendant and the process terminates in step 308. If a "YES" decision is made in step 332, the process continues to step 324 where the transaction is authorized and the process ends in step 326.

The above example illustrates real time interactions among a customer using a telephone or a user interactive system, ASR system 110, host computer 124, and a supplemental data base. However, there may be other embodiments in which ASR system 110 is accessed by LAN 138 or embodiments in which customer names are recorded and stored in a database over a period of time and the data service provided by data base 142 is periodically accessed by ASR system 110 and host computer 124.

The method and system of the present invention achieves advantages over the prior art in that an ASR system can recognize arbitrary spoken words without speaker-specific training. It is to be understood that the above-described embodiments are for illustrative purposes only and that numerous other arrangements of the invention may be devised by one skilled in the art without departing from the scope of the invention as defined by the claims which follow.

The invention claimed is:

1. In an automatic speech recognition (ASR) system having a first data base that stores word models and correlation data on which word recognition decisions are at least partially based, a method of utilizing information stored in a supplemental second data base to enhance capability of the ASR system, the method comprising:

receiving a first spoken input from a user;

the ASR system recognizing the first spoken input from the user;

identifying and retrieving text stored in the supplemental data base using the first spoken input, wherein the retrieved text is not a representation of the first spoken input;

creating a template of the text retrieved from the supplemental data base; and using the template to recognize a second spoken input.

2. The method of claim 1 wherein the step of receiving a first spoken input from a user comprises the step of receiving a spoken telephone number.

3. The method of claim 2 wherein the step of using the template to recognize a second spoken input comprises the step of using a speech recognition algorithm.

4. The method of claim 1 wherein the step of creating a template of the text comprises the step of using a text-to-speech system to generate a phoneme transcription.

5. In a telephone network, a method of using a supplemental data base associated with an automatic speech recognition (ASR) system to enhance the capability of the ASR system, the method comprising the steps of:

receiving an incoming call from a caller;

prompting the caller for an utterance;

recognizing the utterance spoken by the caller;

retrieving stored in a supplemental data base using the utterance as an index wherein the text is not a representation of the utterance;

creating a speaker independent template of the text as retrieved from the supplemental data base; and using the speaker independent template to recognize another utterance corresponding to the text retrieved from the supplemental data base.

6. The method of claim 5 wherein creating a template comprises using a text-to-speech system to generate a phoneme transcription of the text.

7. The method of claim 5 wherein recognizing the other utterance comprises using a speech recognition algorithm and models of phonemes.

8. An automatic speech recognition (ASR) system for use in conjunction with a telephone network, the ASR system comprising:

a calling station served by a switching service point;

means for receiving spoken input;

a telephone line interface unit for delivering the spoken input received from the calling station to a random access memory of a host computer;

a central processing unit in the host computer for retrieving information from a supplemental data base using the spoken input wherein the information received is not a representation of the spoken input;

a text-to-speech means for creating a phoneme transcription of the information retrieved from the supplemental data base; and a speech recognition means for recognizing an utterance associated with the supplemental information.

9. The ASR system of claim 8 wherein the supplemental data base is maintained by a data service provider.

10. The ASR system of claim 8 wherein the supplemental data base is stored in a CD-ROM.

11. The ASR system of claim 8 wherein the supplemental information is retrieved from a local area network.

12. The ASR system of claim 8 wherein the phoneme transcription is used as a speaker independent template.

13. The ASR system of claim 8 wherein the means for receiving an input is a caller ID service.

14. The ASR system of claim 8 wherein the means for receiving an input is a touch tone entry means.

15. The ASR system of claim 8 wherein the speech recognition means comprises an algorithm for comparing model phonemes to spoken utterances.

* * * * *

UNITED STATES PATENT AND TRADEMARK OFFICE
CERTIFICATE OF CORRECTION

PATENT NO. : 5,724,481

DATED : March 3, 1998

INVENTOR(S) : Roger Borgan Garberg, Michael Allen Yudkowsky

It is certified that error appears in the above-identified patent and that said Letters Patent is hereby corrected as shown below:

Column 8, claim 5, line 59, after "retrieving" insert --text--.

Signed and Sealed this

Eighth Day of September, 1998

Attest:

BRUCE LEHMAN

Attesting Officer

Commissioner of Patents and Trademarks